(12) United States Patent
Lewellyn

(10) Patent No.: US 11,376,895 B2
(45) Date of Patent: Jul. 5, 2022

(54) BEADLOCK ASSEMBLY

(71) Applicant: Harry Lewellyn, Costa Mesa, CA (US)

(72) Inventor: Harry Lewellyn, Costa Mesa, CA (US)

(*) Notice: Subject to any disclaimer, the term of this patent is extended or adjusted under 35 U.S.C. 154(b) by 216 days.

(21) Appl. No.: 16/702,429

(22) Filed: Dec. 3, 2019

(65) Prior Publication Data

US 2020/0101799 A1 Apr. 2, 2020

Related U.S. Application Data

(63) Continuation-in-part of application No. 15/634,536, filed on Jun. 27, 2017, now Pat. No. 10,493,806.

(51) Int. Cl.
*B60C 15/032* (2006.01)
*B60C 15/02* (2006.01)
*B60C 5/04* (2006.01)

(52) U.S. Cl.
CPC .............. *B60C 15/032* (2013.01); *B60C 5/04* (2013.01); *B60C 15/0206* (2013.01); *B60C 15/0213* (2013.01)

(58) Field of Classification Search
CPC . B60C 15/02; B60C 15/0206; B60C 15/0209; B60C 15/0213; B60C 15/028; B60C 15/032; B60C 5/04; B60C 5/10; B60C 5/22; B60C 17/01
See application file for complete search history.

(56) References Cited

U.S. PATENT DOCUMENTS

| | | | |
|---|---|---|---|
| 2,898,969 A | 8/1959 | Pfeiffer | |
| 3,935,892 A | 2/1976 | Arimura | |
| 4,263,953 A | 4/1981 | Miceli | |
| 4,995,438 A | 2/1991 | Weber | |
| 5,246,050 A | 9/1993 | Stucker | |
| 6,688,359 B2 | 2/2004 | Blalock | |
| 7,131,477 B2 | 11/2006 | Smith | |
| 10,493,806 B1 * | 12/2019 | Lewellyn | B60C 5/04 |
| 2006/0283533 A1 | 12/2006 | Zuigyou | |
| 2007/0295555 A1 | 12/2007 | O'Rourke | |

* cited by examiner

*Primary Examiner* — Jason R Bellinger
(74) *Attorney, Agent, or Firm* — Nguyen Tarbet LLC

(57) ABSTRACT

A dual, internal, pneumatic, boltless beadlock assembly for effectively securing a tire to a rim is disclosed. A pneumatic beadlock assembly is disposed inside a tire and mounted on a rim. A pneumatic beadlock assembly exerts a force on the two circumferential inner beads of a tire such that the tire stays in secure contact with the rim, even when the inflation pressure of the tire is not sufficient to lock the tire to the rim.

20 Claims, 10 Drawing Sheets

BEADLOCK ASSEMBLY

CROSS-REFERENCES TO RELATED APPLICATIONS

This application is a continuation-in-part and claims benefit of U.S. patent application Ser. No. 15/634,536, filed Jun. 27, 2017, the specification(s) of which is/are incorporated herein in their entirety by reference.

FIELD OF THE INVENTION

The present invention relates to an automotive wheel, more specifically, to a beadlock assembly for maintaining a tire on a rim when the pressure of said tire is not sufficient to secure the tire to the rim.

BACKGROUND OF THE INVENTION

Pneumatic beadlock devices have been in widespread use for several years. The devices are configured to secure the beads of a tire to a rim in situations where the pressure within the tire is insufficient, or additional securing force is needed to secure the tire beads behind the rim bead bumps. Pneumatic beadlock devices are often used to optimize driving performance and traction on nonconventional terrains and during driving off road, off road racing, drag racing, oval, rally, outback challenge and all other racing disciplines where lower than normal tire inflation pressure is advantageous. Beadlock devices have been known to hold tire beads in place even for tire pressures as low as zero pounds per square inch ("psi").

There are five distinct categories of methods/devices, besides the pneumatic beadlock device used to lock tire beads to a rim each described as follows:

1) The conventional mechanical, beadlock rim. This device is the most common throughout all applications. A bolt circle lock ring mechanically clamps the outside tire bead to an inner portion of a specialized rim. Existing rims may also be converted to perform the function of a mechanical beadlock rim.

2) An alternate version of the conventional mechanical, beadlock rim configured to lock both the inside and outside of a tire's beads. This configuration requires increased inside lock ring space and specialized "inboard" brakes may be required.

3) A plastic insert of a given diameter and width having a split rim (two piece rim), locking the inside of each tire bead to the inner tire bead seat surfaces of the rim. The plastic insert must be custom-fit to the thickness of the tire beads and each of the two rim pieces must be sealed with an O-ring.

4) Filling the air chamber of the tire with a solid-fill material that in essence, locks both tire beads to the rim. This method is most commonly used on earth moving equipment and in military applications.

5) A combination of a solid-fill, dual, internal beadlock with an inner/close to the rim solid chamber securing the tire beads to the rim and a main air chamber able to provide a "bullet proof" wheel that will accommodate tire pressure changes for the advantages of operating the wheel in a low-pressure regime.

SUMMARY

The present invention features a beadlock assembly, housed within a tire, surrounding a rim upon which the tire is mounted. The beadlock assembly may effectively secure both tire beads to the rim even when an inflation pressure of the tire is lower than the tire manufacturer's suggested operating inflation pressure. The beadlock assembly may comprise: an inner tube, a beadlock case, and a beadlock air channel. In some embodiments, the inner tube may encircle the rim and feature an inner tube valve stem mounted through the rim for allowing air to enter and exit the inner tube. In other embodiments, the beadlock air channel may join the tire's main air chamber to a tire valve stem mounted in the rim. The main air chamber is an airtight space between the tire, when inflated, and the rim. Air exiting (or entering) the main air chamber travels through the beadlock air channel and is released (or received) via the tire valve stem.

In some embodiments, the beadlock case may encircle the inner tube and feature a beadlock tread disposed along an outer circumference of the beadlock case. A first beadlock sidewall, second beadlock sidewall, first beadlock bead, and second beadlock bead may further comprise the beadlock case, essentially forming a tire within a tire. In some embodiments, the beadlock tread may have a first outer circumferential edge and a second outer circumferential edge. Further, a first terminal end of the beadlock tread and a second terminal end of the beadlock tread may overlap such that a pre-determined distance exists between said first and second terminal ends. An overlap area, herein referred to as the tread overlap, comprising a double layer of the first synthetic material, may be defined by the pre-determined distance and a width of the beadlock tread.

In other embodiments, the beadlock case may further comprise a first beadlock sidewall disposed between the first outer circumferential edge of the beadlock tread and the rim and a second beadlock sidewall disposed between the second outer circumferential edge of the beadlock tread and the rim. Each sidewall is sewn to the under or inside of the beadlock tread.

Supplementary embodiments feature a first beadlock bead comprising a second synthetic material symmetrically or asymmetrically folded over an inner circumferential edge of the first beadlock sidewall and affixed to the first beadlock sidewall via a first stitching. The first stitching may be disposed within a given distance from an edge of the first beadlock bead. Additionally, a second beadlock bead may comprise a third synthetic material symmetrically or asymmetrically folded over an inner circumferential edge of the second beadlock sidewall and affixed to the second beadlock sidewall via a second stitching. The second stitching may be disposed within a distance (equal to the previously mentioned given distance) from the edge of the second beadlock bead.

Consistent with previous embodiments, the beadlock assembly may be inserted into the tire and the inner tube may then be inflated via the inner tube valve stem to allow the beadlock assembly to contact the tire at the two inner circumferential tire beads. The beadlock assembly may exert a force, at said places of contact, such that the tire may stay in secure contact with the rim even in situations where the inflation pressure of the tire is not sufficient to lock the tire to the rim.

One of the unique and inventive technical features of the present invention is an overlapping double-W stitching method joining the flat webbing overlap to form a cylindrical tread. A tremendous force is exerted on the ends of the tread at this webbing interface joint as a result of the relatively high inner tube pressure. Presently known prior references use multiple normal-to-the-tread webbing edge parallel stitches, which leads to eventual failure of the beadlock case and ultimately to a failure of the entire beadlock assembly. The double-W stitching, as used for sewing seatbelts and other strength-critical applications, provides a stronger interface joint, while also providing an increased bobbin tension that serves to bury the stitching. This burying of the stitching makes it less vulnerable to scuffing and wear that occurs when the tire goes flat and the vehicle weight crushes the inside of the tire tread into contact with the circumferential outside of the beadlock case tread.

According to other aspects, the beadlock air channel may comprise an air channel body being sealed on all sides, including a sealed first end, except for an open second end of the air channel body, the tire valve stem disposed on the sealed first end, and an air passage having at least a portion thereof disposed inside the air channel body. A first end of the air passage may be disposed at or near the tire valve stem and a second end of the air passage may be disposed at or near or extending from the open second end of the air channel body. In some embodiments, the air passage may comprise two parallel rows of bumps having a gap disposed between said rows of bumps.

In one embodiment, the air channel body may comprise two strips of material stitched on all sides except for the open second end. The tire valve stem may be disposed through a first strip of the two strips of material and the first end of the air passage is aligned with the tire valve stem. The two parallel rows of bumps may be disposed between and lengthwise along the two strips of material. In preferred embodiments, the gap between the two rows of bumps is sufficiently wide to allow air to pass through the air passage during inflation or deflation while preventing the air channel body from expanding into the gap and stopping air flow. Without wishing to limit the present invention to a particular theory or mechanism, the two parallel rows of bumps and the gap in-between provides a flexible, non-collapsing air channel. The air channel is able to contour to the rim's profile and is non-compressible at the tire and rim.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE DRAWINGS

The features and advantages of the present invention will become apparent from a consideration of the following detailed description presented in connection with the accompanying drawings in which.

DEFINITIONS

Figure 1:
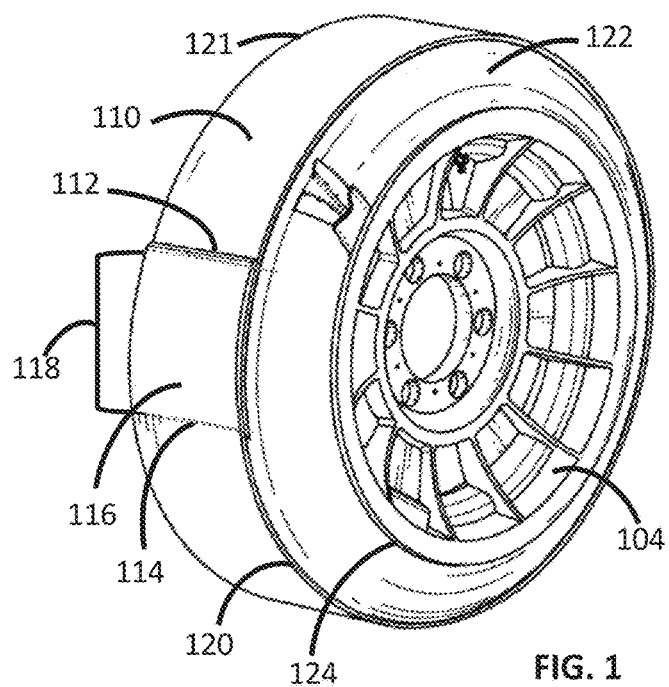
FIG. 1 shows an embodiment of the beadlock case and air channel of the present invention encompassing an inner tube (not shown) disposed on a rim.
Figure 2:
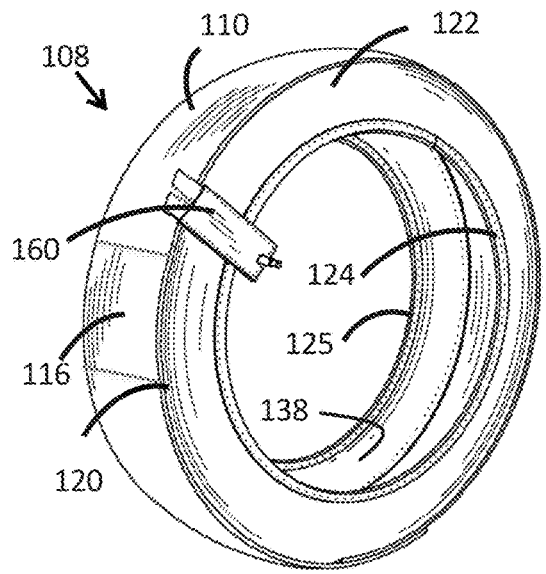
FIG. 2 shows an isolated view of an embodiment of the present beadlock case and air channel.
Figure 3:
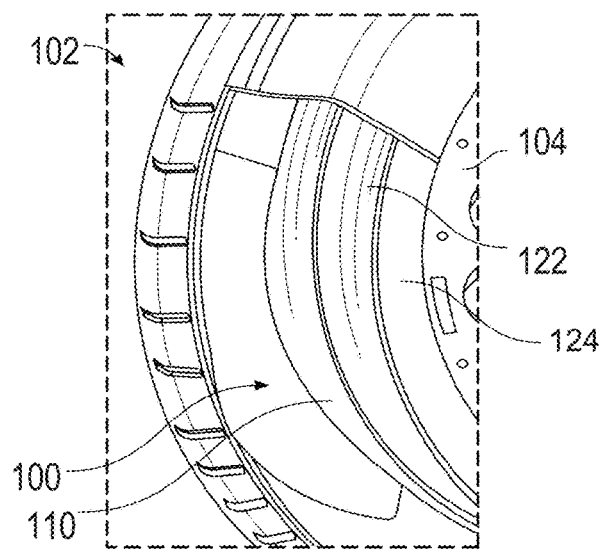
FIG. 3 is a perspective view of the beadlock assembly disposed in a tire.
Figure 4:
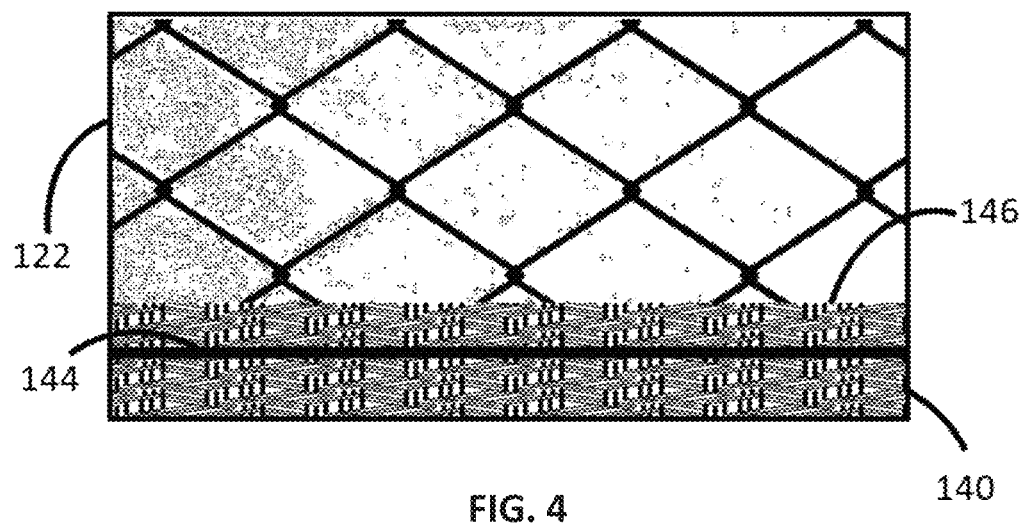
FIG. 4 shows stitching affixing a first beadlock bead to a first beadlock sidewall.
Figure 5:
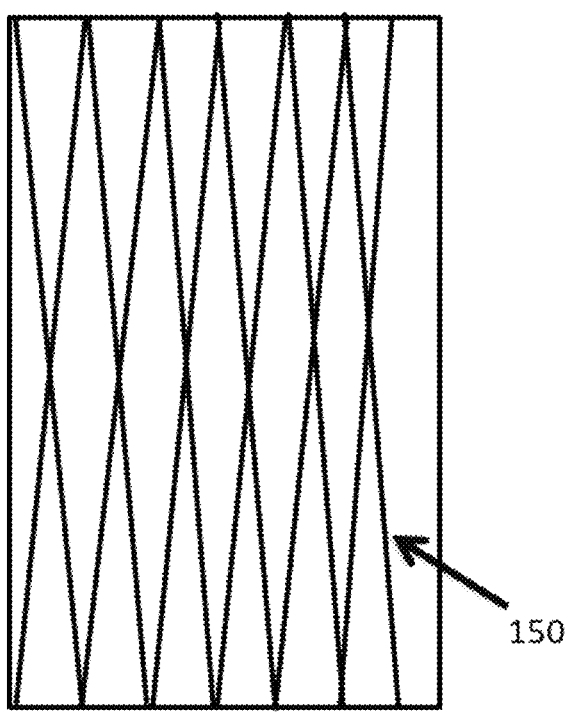
FIG. 5 shows a double-W stitching pattern disposed on an overlap area of the beadlock tread.
Figure 6:
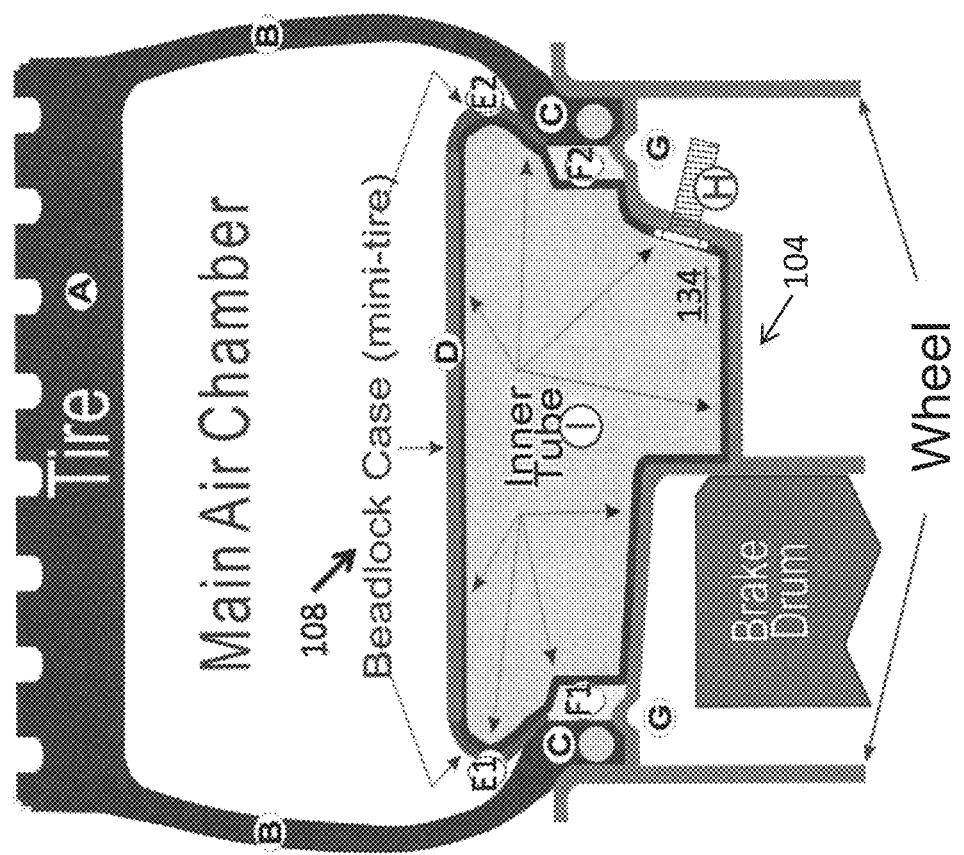
FIG. 6 shows the beadlock case of the present invention disposed within a tire and upon a rim.
Figure 7:
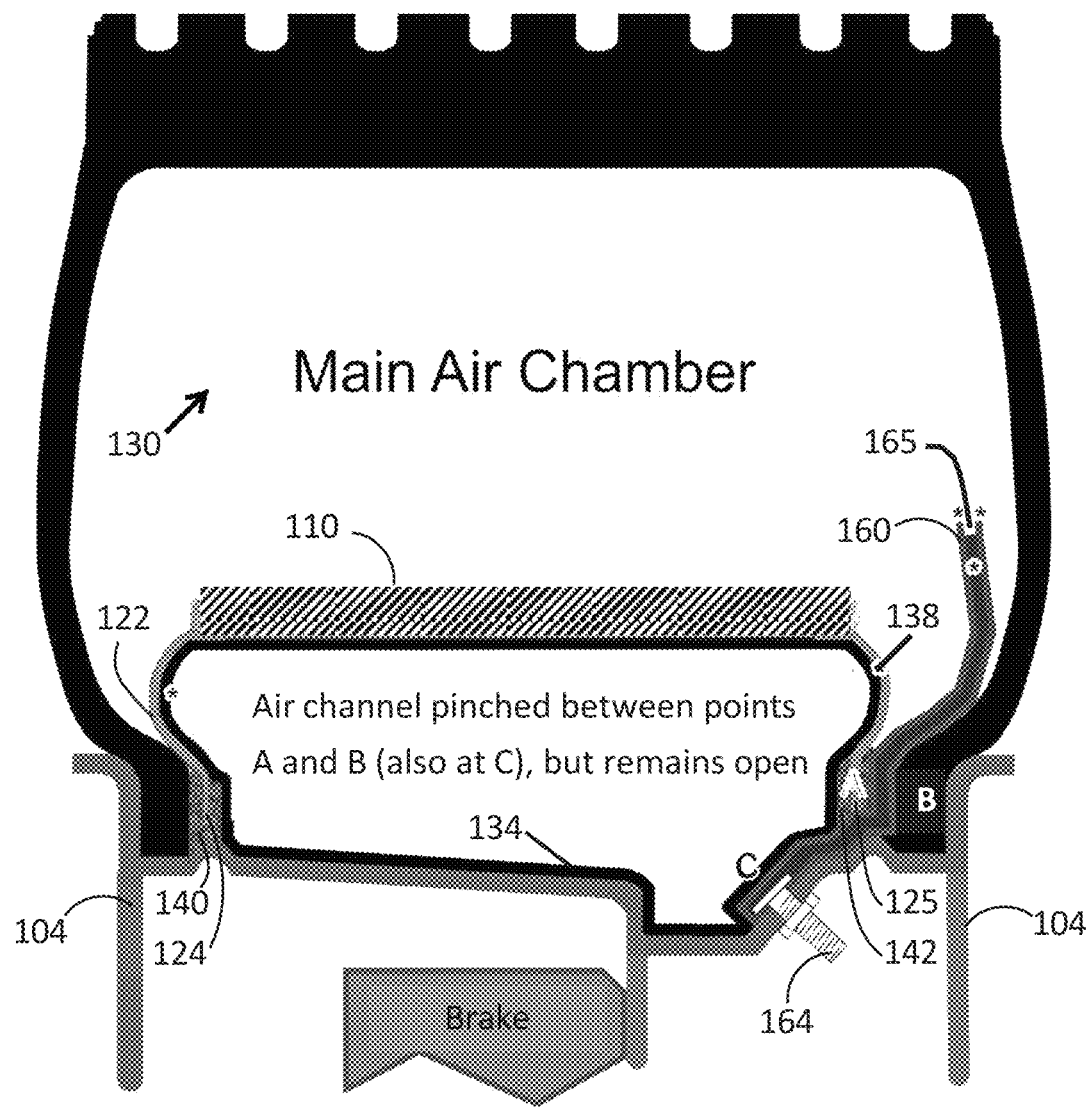
FIG. 7 is a diagrammatical representation of the beadlock assembly.

As used herein, the term beadlock used in conjunction with other terms refers to various components of the current invention.

As used herein, the term "air flow" refers to air movement into and out of the tire valve stem and the inner tube valve stem, e.g. inflation or deflation.

As used herein, the term "drop center" refers to the smallest diameter of the rim. The drop center accommodates mounting a smaller tire's internal bead diameter over a bigger, outermost diameter of the rim.

As used herein, the term "bump", when referring to rows of bumps, refers to sequentially-spaced structures in the air channel that form a flexible and non-crushable channel for air flow into and out of the tire air chamber. These bumps may be individually attached or attached via a bump track.

As used herein, the term "stitch depressions" refer to stitching threads that fall beneath a surface of webbing being sewn. This may be either the top or bottom surfaces of the webbing.

As used herein, the term "tire" refers to the rubber part of an automotive wheel.

As used herein, the term "tread" refers to the relatively thick part of a tire that contacts the ground. The tread contains multiple layers of cords, one of which may be steel or other strengthening materials.

As used herein, the term "tire sidewall" refers to one of two relatively thin vertical sides of a tire. These contain cords, none of which are steel.

As used herein, the term "tire bead" refers to one of two internal diameters of a tire. They are usually thicker than the sidewalls and contain steel reinforcements. The sidewall cords are wrapped down and around the bead steel reinforcement.

As used herein, the term "rim" refers to a metal part of the wheel that accepts the tire and valve stem. The outer side of the rim to be the visible, lug nut side of the rim. The inner side of the rim is the brake, axle or spindle side of the rim. The portion that sees, or contains the inflation gas, (e.g. carbon dioxide, nitrogen, air, or other gases) is the drop center of the rim.

As used herein, the term "main air chamber" refers to an airtight chamber created when the entire tire rubber bead surfaces of the inflated tire are mounted on the rim.

As used herein, the term "tire valve stem" refers to a device mounted in the rim that allows air to enter and exit a main air chamber. For tubeless tires, it makes an airtight seal with the rim. It may be rubber or metal or a combination of rubber and metal.

As used herein, the term "valve core" refers to an inner part of a tire or inner tube valve stem that, when depressed, allows air in and out of either the main air chamber or inner tube. It seals the main air chamber or inner tube shut when not depressed.

As used herein, the term "rim bead bump" refers to a part of the rim that seats a tire bead. The rim bead bump partially locks an inflated tire onto the rim. However, at low tire pressures, the tire can pop off of and over the rim's bead bumps and/or off of the bead seating surfaces, thereby completely flattening the tire's main air chamber. The tire bead seating areas on the rim are made up of vertical and horizontal/axial surfaces just inside of the outermost, horizontal, rim surfaces, in both directions, from the rim's lug nut and brake sides. The bead bumps are independent and inside/at the end of (in both directions, toward the center of a rim's drop center) the rim's, horizontal, tire bead seating surfaces. The bead bumps terminate the tire bead seating surfaces.

As used herein, the term "wheel" refers to an assemblage of the rim, tire and tire valve stem with or without the beadlock assembly disposed within.

As used herein, the term "beadlock case" refers to a "mini-tire" that mounts inside the tire. The beadlock case comprises: a beadlock tread, beadlock sidewalls, and beadlock beads. This case in conjunction with an inner tube contacts the tire at the inside of the tire beads only.

As used herein, the term "beadlock tread" refers to a woven, synthetic webbing material disposed along a circumference of the beadlock case.

As used herein, the term "tread overlap" refers to a portion of the flat tread webbing that overlaps to form an annular beadlock tread.

As used herein, the term "beadlock sidewall" refers to either of two relatively thin vertical sides of the beadlock case. Non-limiting examples of the beadlock sidewall material include, but are not limited to: a woven synthetic fabric, a natural fabric, or polyvinyl chloride ("PVC"). This basic, raw unassembled component is sometimes referred to as a "donut".

As used herein, the term "beadlock bead" refers to synthetic webbing material symmetrically or unsymmetrically folded and sewn to an internal circumference of a beadlock sidewall.

As used herein, the term "beadlock air channel" refers to a channel connecting the tire valve stem to the main air chamber via a crushproof and flexible air passage. The air channel has an air passage formed by two rows of bumps having a gap disposed between the two rows. The two rows of bumps are disposed on the same side of the channel. A non-limiting example of the row of bumps is a zipper track where the zipper teeth form the row of bumps. In other non-limiting embodiments, the bumps may be linear ridges or round protuberances. However, it is to be understood that any structure may be used to form bumps as long as a gap is disposed between the two rows and a height of the structure separates opposing sides of the channel.

As used herein, the term "beadlock assembly" refers to the beadlock case, the inner tube, the associated valve stems, and the beadlock air channel.

DETAILED DESCRIPTION OF THE INVENTION

Following is a list of elements corresponding to elements referred to herein:
100 beadlock assembly
102 tire
104 rim
105 rim recess
106 inner tube valve stem
108 beadlock case
110 beadlock tread
112 first terminal end of the beadlock tread
114 second terminal end of the beadlock tread
116 tread overlap area of the beadlock tread
118 pre-determined distance between the first and second terminal ends of the beadlock tread
120 first outer circumferential edge of the beadlock tread
121 second outer circumferential edge of the beadlock tread
122 first beadlock sidewall
124 inner circumferential edge of the first beadlock sidewall
125 inner circumferential edge of the second beadlock sidewall
127 bead webbing
130 main air chamber
134 inner tube
136 two inner circumferential tire beads
138 second beadlock sidewall
140 first beadlock bead
142 second beadlock bead
144 first stitching affixing the first beadlock bead to the first beadlock sidewall
146 edge of the first beadlock bead
150 double-W stitching pattern
160 beadlock air channel
161 air channel body
162 sealed first end of air channel body
163 open second end of air channel body
164 tire valve stem
165 air passage
166 first end of air passage
167 second end of air passage
168 bumps
169 gap
170 material strip
180 shoulder nut
181 recessed nut Referring now to FIGS. 1-7, the present invention features a beadlock assembly (100), housed within a tire (102), surrounding a rim (104) upon which the tire (102) is mounted. The beadlock assembly (100) may effectively secure the tire (102) to the rim (104) even when an inflation pressure of the tire (102) is lower than the tire manufacturer's suggested operating inflation pressure. In some embodiments, the beadlock assembly (100) comprises an inner tube (134), having an inner tube valve stem (106), encircling the rim (104). The inner tube valve stem (106) may be mounted on the rim (104) and allow air to enter and exit the inner tube (134).

A beadlock case (108) may further comprise the beadlock assembly (100). In some embodiments, the beadlock case (108) encompasses the inner tube (134) and comprises a beadlock tread (110) disposed along an outer circumference of the beadlock case (108). The beadlock tread (110) may be composed of a first synthetic material. Non-limiting examples of the first synthetic material include a woven synthetic fabric, a natural fabric, or PVC. As a non-limiting example, the first synthetic material may exhibit a tensile strength of up to 9,000 or over pounds per inch of width. This tensile strength provides a reduction of stretch of the beadlock tread (110) when the inner tube (134) is exerting a maximum pressure. An example maximum pressure may be 50 psi with a recommended running pressure of 40 psi. The beadlock tread (110) may have a first outer circumferential edge (120) and a second outer circumferential edge (121). Further, a first terminal end of the beadlock tread (112) and a second terminal end of the beadlock tread (114) may overlap such that a pre-determined distance (118) exists between said first and second terminal ends (112,114). An overlap area (116), herein referred to as the tread overlap, comprising a double layer of the first synthetic material, may be defined by the pre-determined distance (118) and a width of the beadlock tread (110).

In additional embodiments, the tread overlap (116) may have a double-W stitching pattern (150) disposed thereon to join the double layer of the first synthetic material together. This double-W stitching pattern (150) may comprise a first set of stitches forming multiple W-shaped patterns and a second set of stitches forming multiple W-shaped patterns rotated 180 degrees relative to the first set of stitches, such that the first set of stitches and the second set of stitches overlap. Additionally, the first set of stitches and the second set of stitches may be embedded in the top, the bottom, or both the top and bottom of the first synthetic material such that an object contacting the surface of the beadlock tread (110) contacts the first synthetic material and not the first or second set of stitches. For instance, the sets of stitches form stitch depressions such that the stitching threads are disposed beneath a surface of material or webbing being sewn. This may be either the top or bottom surfaces of the material or webbing.

In other embodiments, the beadlock case (108) may further comprise a first beadlock sidewall (122) disposed between the first outer circumferential edge (120) of the beadlock tread and the rim (104) and a second beadlock sidewall (138) disposed between the second outer circumferential edge (121) of the beadlock tread and the rim (104). In some embodiments, the first (122) and/or second beadlock sidewall (138) may be composed of a PVC material. Each sidewall is affixed circumferentially to the inside (or under) the beadlock tread.

Supplementary embodiments feature a first beadlock bead (140) comprising a second synthetic material symmetrically or asymmetrically folded over an inner circumferential edge of the first beadlock sidewall (124) and affixed to the first beadlock sidewall (122) via a first stitching (144). The first stitching may be disposed within a given distance from an edge (146) of the first beadlock bead (140). Additionally, a second beadlock bead (142) may comprise a third synthetic material symmetrically or asymmetrically folded over an inner circumferential edge of the second beadlock sidewall (125) and affixed to the second beadlock sidewall (138) via a second stitching. The second stitching may be disposed within a distance (equal to the previously mentioned given distance) from the edge of the second beadlock bead (142). In some embodiments, this common distance is from 1 millimeter to 2 millimeters. In other embodiments, the second synthetic material and the third synthetic material may be composed of a single type of material. Non-limiting examples of the first and second synthetic materials include woven synthetic fabric, natural fabric, or PVC. In additional embodiments, another pair of stitches, each 7 mm to 8 mm away from the first stitching or second stitching. Thus, there are two rows of stitching joining each beadlock bead to its respective beadlock sidewall.

In further embodiments, the beadlock assembly (100) may also comprise a beadlock air channel (160) joining a main air chamber (130) to a tire valve stem (164) mounted to the rim (104). The main air chamber (130) is an airtight space between the tire (102), when inflated, and the rim (104). Air exiting or entering the main air chamber (130) travels through the flexible, non-crushable beadlock air channel (160) and is released or received via the tire valve stem (164).

Consistent with previous embodiments, the beadlock assembly (100) may be inserted into the tire (102) and the inner tube (134) may then be inflated via the inner tube valve stem (106) to allow the beadlock assembly (100) to contact the tire (102) at the two inner circumferential tire beads (136). The beadlock assembly (100) may exert a force, at said places of contact, such that the tire (102) may stay in secure contact with the rim (104) even in situations where the inflation pressure of the tire (102) is not sufficient to lock the tire (102) to the rim (104).

The present invention also features a method for effectively securing a tire to a rim utilizing the previously detailed beadlock assembly (100). In some embodiments, the method comprises removing the manufacturer's rim valve stem to create a first opening in the rim; creating a second opening in the rim a predetermined distance from the first opening; mounting the beadlock case within the tire and around the rim such that the tread overlap is opposite both the first opening and the second opening; mounting the inner tube into the beadlock case and around the rim such that the second opening encircles the inner tube valve stem, wherein the inner tube has not been inflated; positioning the first beadlock bead and the second beadlock bead over the rim; installing the beadlock air channel such that the first opening encircles a valve stem of the beadlock air channel; partially inflating the inner tube until the two inner circumferential tire beads are in air-holding contact with the rim; positioning the two inner circumferential tire beads onto the rim; deflating the tire and inflating the inner tube fully; and inflating the tire.

The tread overlap is positioned opposite the first and second openings so that the weight of the tread overlap counter balances a combined weight of the inner tube valve stem and the valve stem of the beadlock air channel. In this configuration, the beadlock assembly may exert a force on the two inner circumferential tire beads such that the tire may stay in secure contact with the rim, even when the inflation pressure of the tire is not sufficient to lock the tire to the rim.

Referring to FIGS. 8-11B, according to some embodiments, the beadlock air channel (160) comprises an elongated, air channel body (161) being sealed on all sides, including a sealed first end (162), except for an open second end (163) of the air channel body (161), the tire valve stem (164) disposed on the sealed first end (162) of the air channel body, and an air passage (165) having at least a portion thereof disposed inside the air channel body (161). A first end (166) of the air passage may be disposed at or near the tire valve stem (164) and a second end (167) of the air passage may be disposed at or near or extending from the open second end (163) of the air channel body. In some embodiments, the air passage (165) may comprise two parallel rows of bumps (168) having a gap (169) disposed between said rows of bumps (168).

Figure 10:
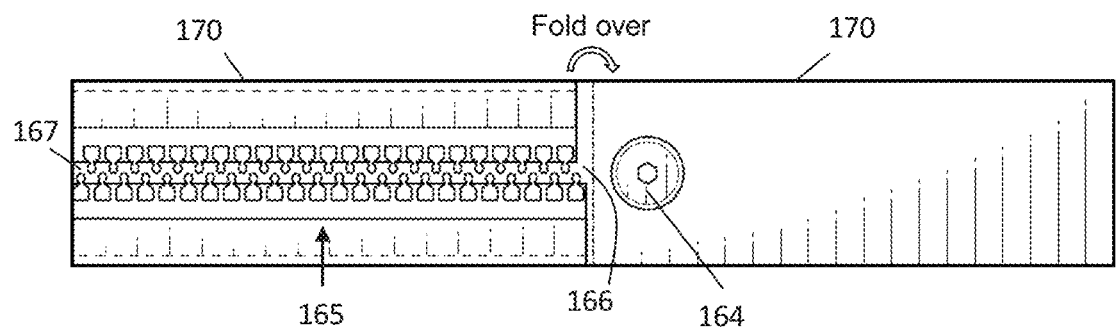
FIG. 10 shows a perspective internal view of unassembled beadlock air channel components.

As shown in FIG. 10, the air channel body (161) may comprise two strips of material (170) stitched on all sides except for the open second end (163). The tire valve stem (164) may be disposed through a first strip of the two strips of material (170) and the first end (166) of the air passage is aligned with the tire valve stem (164). In some embodiments, the two parallel rows of bumps (168) may be disposed between and lengthwise along the two strips of material (170). In other embodiments, the two rows of bumps (168) may be disposed along the middle of the strips (170).

In preferred embodiments, the gap (169) between the two rows of bumps is sufficiently wide to allow air to pass through the air passage during inflation or deflation while preventing the air channel body (161) from expanding into the gap and stopping air flow. In some embodiments, the gap (169) may be about 0.5 mm to about 2 mm wide, for example, 1-2 mm. In other embodiments, a height of each bump is about 0.5 mm to about 2 mm, for example 0.5-1 mm.

There are two primary objectives of the beadlock air channel (160): 1) It must contour to the curves of the drop center of the rim and; 2) It must remain open under the pressure of the inner tube forcing the air channel body (161) into the gap of the air passage. Previous air channels failed in both regards. If the air channel was stiff enough to not collapse under the inner tube pressure, that stiffness prevented contouring of the air channel to the rim, thereby creating gaps between the air channel and the rim that allowed the inner tube to enter the gaps and rupture. If the air channel was flexible enough to contour to the rim, the inner tube would eventually force the air channel body into the air passage channel and stop air flow. No previous air channel designs used bumps. All previous designs suffered collapsed air passages or ruptured inner tubes.

Without wishing to limit the present invention to a particular theory or mechanism, the two parallel rows of bumps (168) provide a flexible, non-collapsing air channel. The air channel is able to contour to the rim's profile and is also non-compressible at the tire bead to beadlock bead interface. Furthermore, the gap between the two rows of bumps is sufficiently wide enough to pass air but not so wide as to allow the air channel body to be forced into the gap and stop air flow.

Figure 8:
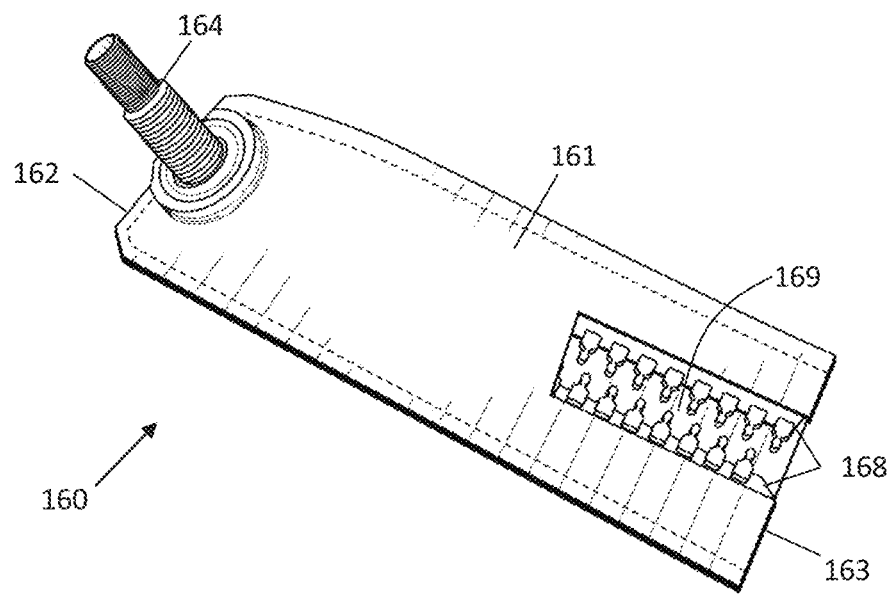
FIG. 8 shows a non-limiting embodiment of a beadlock air channel.
Figure 9:
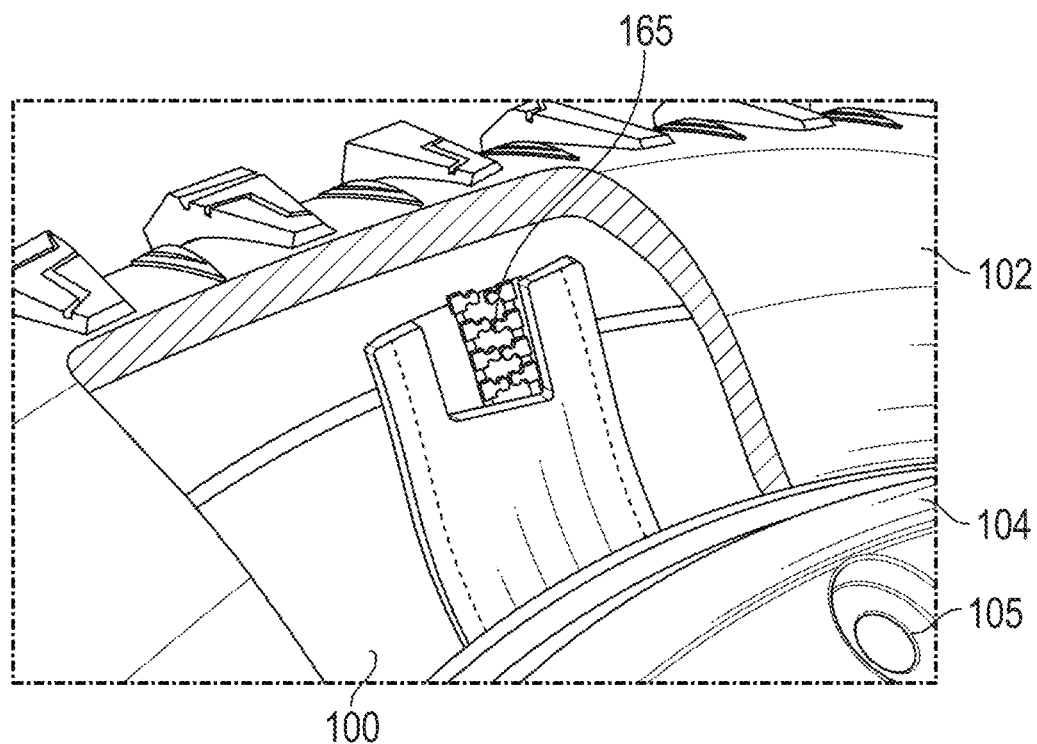
FIG. 9 shows the beadlock air channel disposed in a wheel.
Figures 11A, 11B:
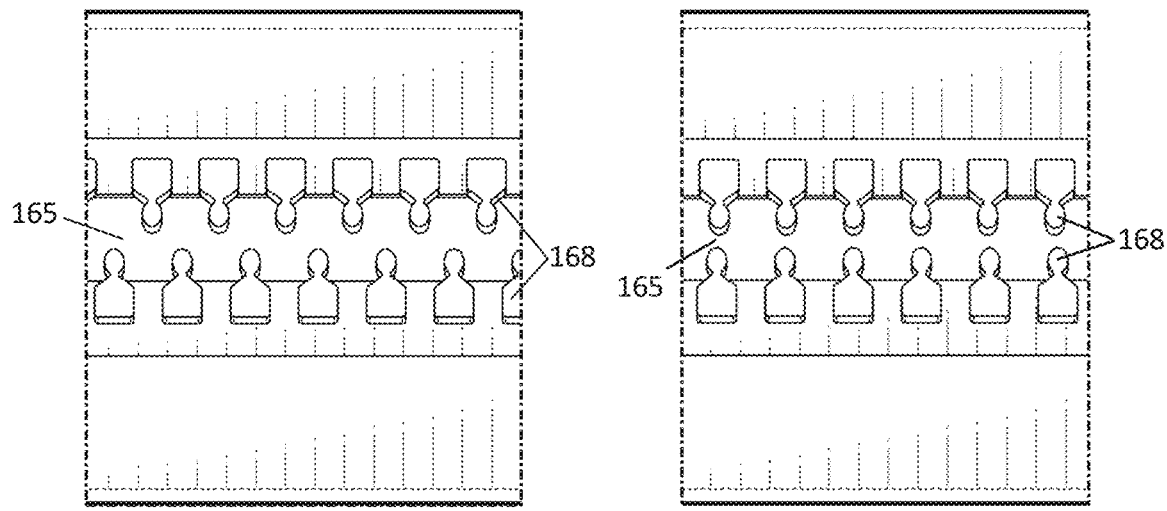
FIG. 11A shows a close-up view of an air passage of the beadlock air channel
FIG. 11B is a close-up view of an alternative embodiment of the air passage.
Figure 12:
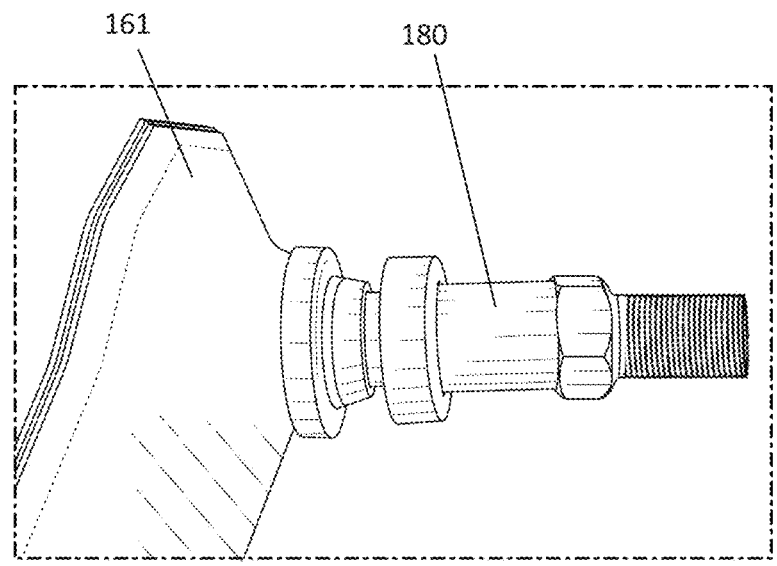
FIG. 12 shows an embodiment of a valve stem of the beadlock air channel.

According to one embodiment, for example, the air passage may comprise zipper tracks. Referring to FIG. 8, a first row of bumps (168) comprises a first zipper track and a second row of bumps (168) comprises a second zipper track. The teeth of the zipper tracks form the bumps. The gap (169) is disposed between the teeth of the zipper tracks. The teeth of the first zipper track face the teeth of the second zipper track. In a preferred embodiment, the first row of teeth is offset and staggered from the second row of teeth as shown in FIG. 11A. The configuration is believed to increase air flow. In an alternative embodiment, the first row of teeth is aligned with the second row of teeth as shown in FIG. 11B.

According to one embodiment, the air channel may be assembled as follows. As shown in FIG. 10, the zipper tracks are sewn close to a poly vinyl chloride (PVC) strip of material. A number 12 zipper may be used, but any size zipper can also work. It is preferred that the zipper is sized so as to provide sufficient vertical space for air to pass. Vertical refers to a height of each tooth. In one embodiment, the strips of material may be, for example, 40 ounce PVC to provide a desired air passage, zipper enclosing, and flexible material. However, any weight PVC may be used but the gap width should be reduced due to the weakness and compressibility of thinner PVC. The two strips of material are folded over each other and sewn to make an envelope or pocket. The zipper tracks are juxtaposed (FIG. 11A) between the two strips to form an internal air passage. This PVC envelope may cover any standard rubber or metal automotive valve stem. By using the zipper teeth to create an air passage that separates the two strips of material and a gap between the two zipper tracks, both objectives of the air channel are achieved.

According to some embodiments, the present invention features a beadlock assembly (100), housed within a tire (102) and surrounding a rim (104) upon which the tire (102) is mounted. The beadlock assembly (100) may comprise an inner tube (134), encircling the rim (104), having an inner tube valve stem (106) mounted on the rim (104), a beadlock case (108) encompassing the inner tube (134), and an elongated, air channel body (161). In some embodiments, the beadlock case (108) may comprise a beadlock tread (110) disposed along an outer circumference of the beadlock case (108), the beadlock tread (110) having a first outer circumferential edge (120) and a second outer circumferential edge (121), a first beadlock sidewall (122) disposed between the first outer circumferential edge (120) of the beadlock tread and the rim (104), a second beadlock sidewall (138) disposed between the second outer circumferential edge (121) of the beadlock tread and the rim (104), a first beadlock bead (140) disposed on an inner circumferential edge (124) of the first beadlock sidewall, and a second beadlock bead (142) disposed on an inner circumferential edge (125) of the second beadlock sidewall.

In other embodiments, the beadlock air channel (160) may comprise an elongated, air channel body (161) being sealed on all sides, including a sealed first end (162), except for an open second end (163) of the air channel body (161), a tire valve stem (164) disposed on the sealed first end (162) of the air channel body, and an air passage (165) having at least a portion thereof disposed inside the air channel body (161). A first end (166) of the air passage is disposed at or near the tire valve stem (164) and a second end (167) of the air passage is disposed at or near or extending from the open second end (163) of the air channel body. The air passage (165) may comprise two parallel rows of bumps (168) having a gap (169) disposed between said rows of bumps (168). In some embodiments, the tire valve stem (164) is mounted to the rim (104). The beadlock air channel (160) joins the tire valve stem (164) mounted to the rim (104) to a main air chamber (130). The main air chamber (130) is an air tight space between the tire (102), when inflated, and the rim (104). The beadlock air channel (160) allows air to enter and exit the main air chamber (130) via the tire valve stem (164) and air passage (165).

In some embodiments, the beadlock assembly (100) is housed in the tire (102) such that the beadlock assembly (100) contacts the tire (102) at two inner circumferential tire beads (136). The inner tube (134) disposed within the beadlock assembly (100) is inflated from the inner tube valve stem (106). Inflation of the beadlock assembly (100) causes a force to be exerted on the two inner circumferential tire beads (136) such that the tire (102) stays mounted on the rim (104) even when the inflation pressure of the tire (102) is not sufficient to lock the tire (102) to the rim (104). The air channel body (161) can contour to a profile of the rim when the tire (102) is mounted thereon. Without wishing to be limited to a particular theory or mechanism, the two rows of bumps allow for air to flow through the air passage (165) even when the beadlock case beads (140, 142) are pressed against the tire beads (136) under severe beadlock bead to tire bead compression. Preferably, the gap (169) is sufficiently wide to allow air to pass through the air passage during inflation or deflation while preventing the air channel body (161) from being forced into the gap and stopping air flow. For example, the gap may be about 0.5 mm to about 2 mm wide.

In some embodiments, the first beadlock sidewall (122), the second beadlock sidewall (138), and the air channel body (161) may comprise rubber, PVC, or similar materials.

According to some embodiments, a first row of bumps (168) comprises a first zipper track and a second row of bumps (168) comprises a second zipper track. The teeth of the zipper tracks form the bumps. The teeth of the first zipper track face the teeth of the second zipper track FIG. 11B) such that the gap (169) is disposed between the teeth of the zipper tracks. In a preferred embodiment, the teeth of the first zipper track are offset and staggered (FIG. 11A) from the teeth side of the second zipper track. In one embodiment, a height of each bump is about 0.5 mm to about 2 mm.

In other embodiments, the beadlock tread (110) may be composed of a first material. A first terminal end of the beadlock tread (112) and a second terminal end of the beadlock tread (114) overlap such that a pre-determined distance (118) exists between said first and second terminal ends (112,114). In one embodiment, the tread overlap may be about 4-7 inches. The tread overlap (116) is defined by the pre-determined distance (118) and a width of the beadlock tread (110). In one embodiment, the tread overlap (116) has a double-W stitching pattern (150) disposed thereon to join together each layer of the double layer of the first synthetic material. The double-W stitching pattern (150) comprises a first set of stitches forming multiple W-shaped patterns and a second set of stitches forming multiple W-shaped patterns rotated 180 degrees relative to the first set of stitches. The first set of stitches overlap with the second set of stitches. The sets of stitches may form stitch depressions such that the stitching threads of the sets of stitches are disposed beneath (e.g. embedded) a surface of material or webbing being sewn. This may be either the top or bottom surfaces of the material or webbing. In some embodiments, the tread overlap (116) may comprise a double layer of the first material. The first material has a tensile strength sufficient for providing a reduction of stretch of the beadlock tread (110) when the inner tube (134) is exerting a maximum pressure.

Figure 13:
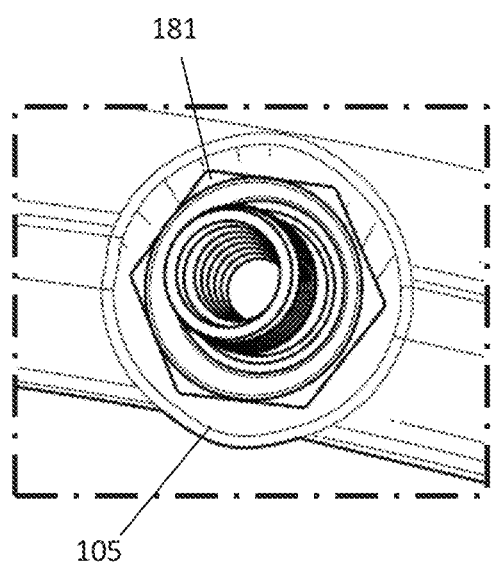
FIG. 13 shows a prior embodiment of a recessed nut on a standard metal valve stem used in a recessed rim valve stem hole.
Figure 14:
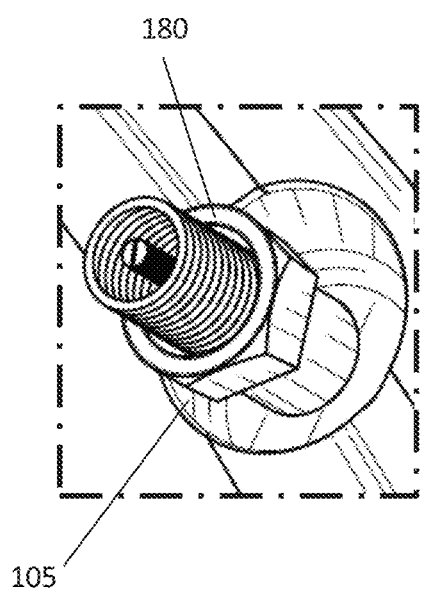
FIG. 14 shows a shoulder nut used on a non-standard metal valve stem of the present invention used in the recessed rim valve stem hole.

In some embodiments, the air channel valve stem (164) includes a shoulder nut (180) that extends away from a recess (105) of the rim. As shown in FIG. 13, conventional recesses for the valve stem have a small diameter with access-confining edges in the rim. A standard, recessed nut (181) disposed in the counter bore would be inaccessible for tightening since there is no room for a socket or any other tool to reach the nut. Referring to FIG. 14, the present invention provides a shoulder nut (180) that can be disposed in a standard counter bore, which extends the securing nut up and out of the counter bore, allowing for full access to tighten the valve stem as required to achieve an airtight seal in the tubeless rim.

According to some embodiments, the first beadlock bead (140) may comprise a second material folded over an inner circumferential edge (124) and affixed to the first beadlock sidewall (122). The second beadlock bead (142) may also include the second material folded over an inner circumferential edge (125) and affixed to the second beadlock sidewall (138). The second material folded over each of the inner circumferential edges (124, 125) form a bead webbing (127). In preferred embodiments, the second material is sufficiently flexible to prevent rippling or wrinkling of the bead webbing (127).

Figure 15:
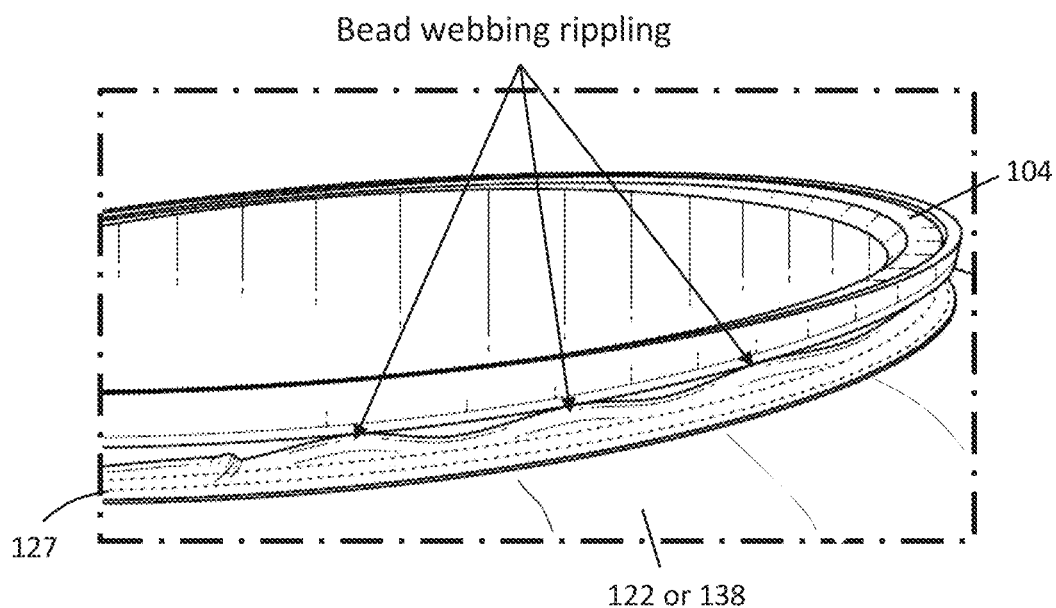
FIG. 15 is a prior embodiment of a stiff bead webbing of the beadlock case.
Figure 16:
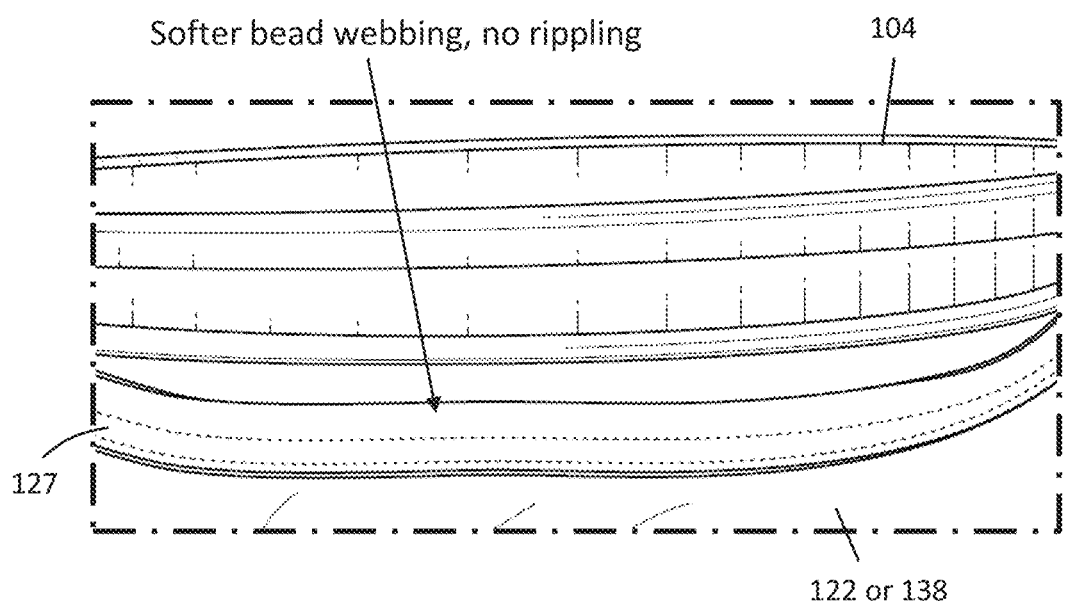
FIG. 16 is a flexible bead webbing of the beadlock case of the present invention.

As shown in FIG. 15, if the first or second material is too stiff, the bead webbing wrinkles due to the two different diameters that it has to accommodate. This creates bumps in the bead that can cause tube failure. For example, the inner tube may develop pre-rupture bubbles or dimples, or the inner tube may escape the bead and rupture. FIG. 16 shows how a more flexible folded bead webbing material curves, but does not ripple or wrinkle. Without wishing to be bound to theory, the reason for the folding may be due to the inner circumference being shorter than the outer circumference. When in use, the bead webbing lays flat or 90°, making for a longer outer circumference compared to the shorter inner circumference. A more flexible material is preferable because it can reduce or prevent ripples. In some embodiments, the flexibility of the material may depend on the weaving and/or the number of thread layers and/or the material composition. Examples of the second material include, but are not limited to, woven synthetic fabric, woven natural fabric, or PVC.

In further embodiments, the bead webbing material is preferably cold cut, i.e. cut with scissors or knife without melting the bead webbing material. This softer cut produces a dull edge that does not cut the inner tube contained within the beadlock assembly. In other embodiments, other bead materials are also cut using cold tools. If a piece of material is cut with a hot knife, normally to prevent fraying, a hardened edge may form, which can cut the inner tube when inflated to high pressures.

Without wishing to be limited to a particular theory or mechanism, the beadlock assembly (100) of the present invention offers protective features when used in a tire and wheel assembly. In some embodiments, the beadlock assembly acts as a tire and rim protective bump stop such that the beadlock prevents the tire (102) from being dismounted off the rim (104), and/or prevents bending or breaking of the rim. In some other embodiments, the beadlock assembly can also prevent at least a portion of a sidewall of the tire from rolling under the rim and contacting a ground surface. For example, the beadlock assembly can prevent the tire from rolling axially under the rim under very hard, high speed cornering at low pressure, e.g. less of the tire sidewall is contacting the ground.

The beadlock assembly (100) of the present invention can function as a 50 psi mini-tire within the otherwise low pressure primary, outer tire to protect both the rim and outer tire. In some embodiments, the beadlock assembly features a heavy duty inner tube and stronger beadlock tread and sidewall materials. For example, the standard inner tube is about 1.5-2 lbs. whereas the heavy duty inner tube of the beadlock assembly weighs 3 lbs. or more. As another example, the beadlock sidewall material may be twice as strong as standard sidewall materials, e.g. 40 oz. PVC vs. 20 oz. PVC. Also, the tread material may be 9 times stronger than standard tread materials, e.g. 9,000 lbs/inch vs. 1,000 lbs/inch. In some embodiments, the inner tube is sized such that it does not have to stretch or it has minimal stretching to completely fill the interior of the beadlock case, thus keeping the inner tube material thickness at or close to its thickest size or its non-stretched, non-inflated thickness.

Figure 17:
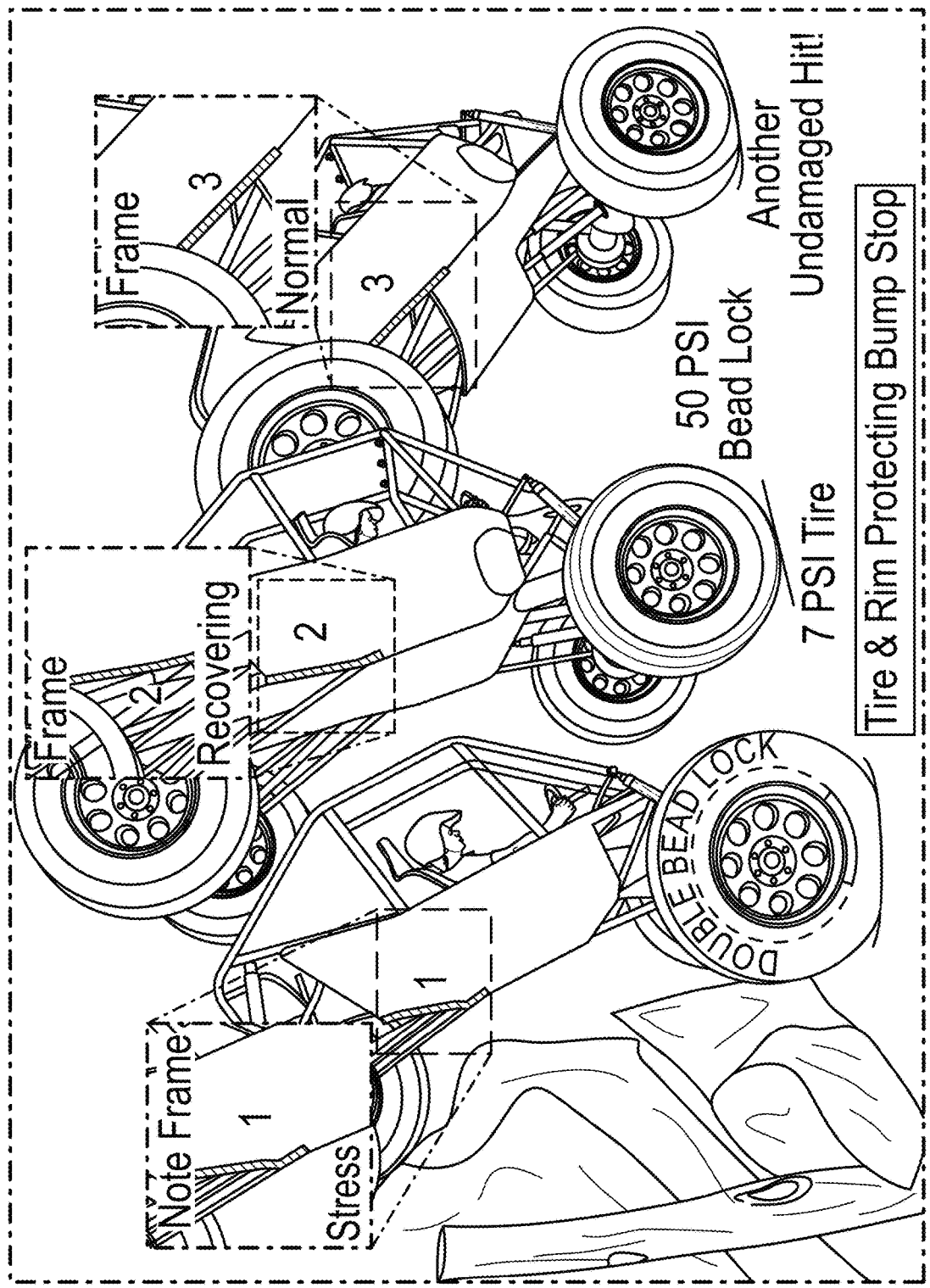
FIG. 17 shows a frame-by-frame sequence an off-road vehicle impacting a ground surface. The off-road vehicle utilized the beadlock case of the present invention, which reduced the damage to the vehicle body while also keeping the tire mounted on the rim.
Figure 18:
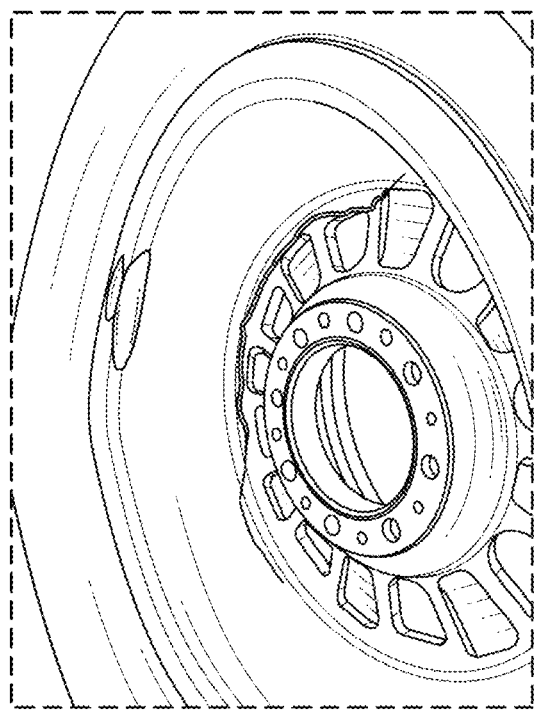
FIG. 18 shows a resulting tire and wheel, which utilized the beadlock case of the present invention, after impact. The beadlock case functioned as a tire and rim (wheel) protective bump stop and kept the tire mounted on the rim.

FIG. 17 shows an off-road vehicle impacting the ground. Although there is some temporary damage to the vehicle body, indicating the severity of the impact, the beadlock not only reduced body and frame damage but also kept the tire mounted on the rim and eliminated tire and rim damage so that the vehicle was able to finish the race. Referring to FIG. 18, another example of tire and wheel of an off-roading vehicle is shown. The off-road vehicle performed in the roughest of rough off-road competitions called Rock Bouncers. The vehicle hit a tree at about 60 MPH and finished the race on this wheel despite the tire and rim damage because the beadlock assembly of the present invention was utilized in this vehicle to keep the tire mounted on the rim.

As used herein, the term "about" refers to plus or minus 10% of the referenced number.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the below claims are solely for ease of examination of this patent application, and are exemplary, and are not intended in any way to limit the scope of the claims to the particular features having the corresponding reference numbers in the drawings. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting of", and as such the written description requirement for claiming one or more embodiments of the present invention using the phrase "consisting of" is met.

What is claimed is:

1. A beadlock air channel (160) comprising:
   a. an elongated, air channel body (161) being sealed on all sides, including a sealed first end (162), except for an open second end (163) of the air channel body (161);
   b. a tire valve stem (164) disposed on the sealed first end (162) of the air channel body; and
   c. an air passage (165) having at least a portion thereof disposed inside the air channel body (161), wherein a first end (166) of the air passage is disposed at or adjacent to the tire valve stem (164) and a second end (167) of the air passage is disposed at, or adjacent to, or extending from the open second end (163) of the air channel body, wherein the air passage (165) comprises two parallel rows of bumps (168) having an air passage gap (169) disposed between said rows of bumps (168).

2. The beadlock air channel (160) of claim 1, wherein a first row of the two rows of bumps (168) comprises a first zipper track, wherein a second row of the two rows of bumps (168) comprises a second zipper track, wherein teeth of the first zipper track and teeth of the second zipper track form the two parallel rows of bumps, wherein the teeth of the first zipper track face the teeth of the second zipper track, wherein the air passage gap (169) is disposed between the parallel rows of zipper track teeth.

3. The beadlock air channel (160) of claim 2, wherein the teeth of the first zipper track are offset from the teeth of the second zipper track.

4. The beadlock air channel (160) of claim 1, wherein the air passage gap (169) is sufficiently wide to allow air to pass through the air passage during inflation while preventing the air channel body (161) from expanding into the air passage gap (169) and stopping air flow.

5. The beadlock air channel (160) of claim 1, wherein the air passage gap (169) is about 0.5 mm to about 2 mm wide, wherein a height of each bump is about 0.5 mm to about 2 mm.

6. The beadlock air channel (160) of claim 1, wherein the air channel body (161) comprises two strips of material (170) stitched on all sides except for the open second end (163), wherein the tire valve stem (164) is disposed through a first strip of the two strips of material (170), wherein the first end (166) of the air passage is aligned with the tire valve stem (164), wherein the two parallel rows of bumps (168) are disposed between and lengthwise along the two strips of material (170).

7. The beadlock air channel (160) of claim 1, wherein the tire valve stem (164) includes a shoulder nut (180).

8. A beadlock assembly (100), housed within a tire (102) and surrounding a rim (104) upon which the tire (102) is mounted, the beadlock assembly (100) comprising:
   a. an inner tube (134), encircling the rim (104), having an inner tube valve stem (106) mounted on the rim (104);
   b. a beadlock case (108) encompassing the inner tube (134), wherein the beadlock case (108) comprises:
      i. a beadlock tread (110) disposed along an outer circumference of the beadlock case (108), wherein the beadlock tread (110) has a first outer circumferential edge (120) and a second outer circumferential edge (121);
      ii. a first beadlock sidewall (122) disposed between the first outer circumferential edge (120) of the beadlock tread (110) and the rim (104);
      iii. a second beadlock sidewall (138) disposed between the second outer circumferential edge (121) of the beadlock tread (110) and the rim (104);
      iv. a first beadlock bead (140) disposed on an inner circumferential edge (124) of the first beadlock sidewall; and
      v. a second beadlock bead (142) disposed on an inner circumferential edge (125) of the second beadlock sidewall; and
   c. a beadlock air channel (160) comprising:
      i. an elongated, air channel body (161) being sealed on all sides, including a sealed first end (162), except for an open second end (163) of the air channel body (161);
      ii. a tire valve stem (164) disposed on the sealed first end (162) of the air channel body; and
      iii. an air passage (165) having at least a portion thereof disposed inside the air channel body (161), wherein a first end (166) of the air passage is disposed at or adjacent to the tire valve stem (164) and a second end (167) of the air passage is disposed at, or adjacent to, or extending from the open second end (163) of the air channel body, wherein the air passage (165)

comprises two parallel rows of bumps (168) having an air passage gap (169) disposed between said rows of bumps (168);

wherein the tire valve stem (164) is mounted to the rim (104), wherein the beadlock air channel (160) joins a main air chamber (130) and the tire valve stem (164) mounted to the rim (104), wherein the main air chamber (130) is an air tight space between the tire (102), when inflated, and the rim (104), wherein the tire valve stem (164) allows air to enter and exit the main air chamber (130) through the air passage (165), wherein the beadlock assembly (100) is housed in the tire (102) such that the beadlock assembly (100) contacts the tire (102) at two inner circumferential tire beads (136), wherein the inner tube (134) disposed within the beadlock assembly (100) is inflated from the inner tube valve stem (106), wherein the beadlock assembly (100) exerts a force on the two inner circumferential tire beads (136) such that the tire (102) stays mounted on the rim (104) even when the inflation pressure of the tire (102) is not sufficient to lock the tire (102) to the rim (104), wherein the two parallel rows of bumps (168) allow for air to flow through the air passage (165) even when the tire beads (136) are pressed against the beadlock beads (140, 142), wherein the air passage gap (169) is sufficiently wide to allow air to pass through the air passage during inflation or deflation while preventing the inner tube (134) from expanding into the air passage gap (169) and stopping air flow, wherein the air channel body (161) contours to a profile of the rim when the tire (102) is mounted thereon.

9. The beadlock assembly (100) of claim 8, wherein a first row of the two parallel rows of bumps (168) comprises a first zipper track, wherein a second row of the two parallel rows of bumps (168) comprises a second zipper track, wherein teeth of the first zipper track and teeth of the second zipper track form the two parallel rows of bumps (168), wherein the teeth of the first zipper track faces the teeth of the second zipper track, wherein the air passage gap (169) is disposed between the teeth of the first zipper track and the teeth of the second zipper track.

10. The beadlock assembly (100) of claim 9, wherein the teeth of the first zipper track are offset the teeth of the second zipper track.

11. The beadlock assembly (100) of claim 8, wherein the air passage gap (169) is about 0.5 mm to about 2 mm wide, wherein a height of each bump is about 0.5 mm to about 2 mm.

12. The beadlock assembly (100) of claim 8, wherein the air channel body (161) comprises two strips of material stitched on all sides except for the open second end (163), wherein the tire valve stem (164) is disposed through a first strip of the two strips of material (170), wherein the first end (166) of the air passage is aligned with the tire valve stem (164), wherein the two parallel rows of bumps (168) are disposed between and lengthwise along the two strips of material (170).

13. The beadlock assembly (100) of claim 8, wherein the beadlock tread (110), is composed of a first material, wherein a first terminal end of the beadlock tread (112) and a second terminal end of the beadlock tread (114) overlap such that a pre-determined distance (118) exists between said first and second terminal ends (112,114), wherein a tread overlap (116), comprising a double layer of the first material, is defined by the pre-determined distance (118) and a width of the beadlock tread (110), wherein the tread overlap (116) has a double-W stitching pattern (150) disposed thereon to join together each layer of the double layer of the first synthetic material, wherein the double-W stitching pattern (150) comprises a first set of stitches forming multiple W-shaped patterns and a second set of stitches forming multiple W-shaped patterns rotated 180 degrees relative to the first set of stitches, wherein the first set of stitches and the second set of stitches overlap, wherein stitching threads of the first set of stitches and the second set of stitches form stitch depressions that are disposed beneath a surface of the material being sewn.

14. The beadlock assembly (100) of claim 13, wherein the first material has a tensile strength sufficient for providing a reduction of stretch of the beadlock tread (110) when the inner tube (134) is exerting a maximum pressure.

15. The beadlock assembly (100) of claim 8, wherein the first beadlock bead (140) comprises a second material folded over the inner circumferential edge (124) and affixed to the first beadlock sidewall (122), wherein the second beadlock bead (142) comprises the second material folded over the inner circumferential edge (125) and affixed to the second beadlock sidewall (138), wherein the second material folded over each of the inner circumferential edges (124, 125) form a bead webbing (127), wherein the second material is sufficiently flexible to prevent rippling or wrinkling of the bead webbing (127).

16. The beadlock assembly (100) of claim 15, the second material is composed of woven synthetic fabric, woven natural fabric, or polyvinyl chloride ("PVC").

17. The beadlock assembly (100) of claim 8, wherein the beadlock assembly acts as a tire and rim protective bump stop such that the beadlock prevents the tire (102) from being dismounted off the rim (104).

18. The beadlock assembly (100) of claim 8, wherein the beadlock assembly prevents at least a portion of a sidewall of the tire from rolling under the rim and contacting a ground surface.

19. The beadlock assembly (100) of claim 8, wherein the first beadlock sidewall (122), the second beadlock sidewall (138), and the air channel body (161) are composed of a polyvinyl chloride material ("PVC").

20. The beadlock assembly (100) of claim 8, wherein the tire valve stem (164) includes a shoulder nut (180) that extends a nut (181) away from a recess (105) of the rim.

* * * * *